United States Patent [19]

Daly et al.

[11] Patent Number: 5,389,261
[45] Date of Patent: Feb. 14, 1995

[54] CONDENSATE POLISHER REGENERANT SYSTEM

[75] Inventors: John Daly, Mississauga; Ronald Oleka, Oakville, both of Canada

[73] Assignee: Grace Dearborn Inc., Canada

[21] Appl. No.: 114,793

[22] Filed: Aug. 31, 1993

[30] Foreign Application Priority Data

Sep. 1, 1992 [CA] Canada .................................. 2077312

[51] Int. Cl.$^6$ ................................................ C02F 1/42
[52] U.S. Cl. ................................... 210/674; 210/670; 210/660; 521/26
[58] Field of Search .................... 210/674, 670, 660; 521/26

[56] References Cited

U.S. PATENT DOCUMENTS

| | | | |
|---|---|---|---|
| 3,414,507 | 12/1968 | Calmon | 210/674 |
| 3,939,071 | 2/1976 | Katzakian, Jr. et al. | 210/674 |
| 4,298,477 | 11/1981 | Cole | 210/674 |
| 4,753,736 | 6/1988 | Reichgott | 210/674 |
| 5,006,258 | 4/1991 | Veatch et al. | 210/677 |

*Primary Examiner*—Cynthia L. Nessler
*Attorney, Agent, or Firm*—James P. Barr

[57] ABSTRACT

High pressure boiler condensate returns are polished and softened with a macroreticular cation exchange resin, and the resin is regenerated with a readily ionizable organic acid salt of a relatively low volatility amine corrosion inhibitor.

14 Claims, No Drawings

CONDENSATE POLISHER REGENERANT SYSTEM

FIELD OF THE INVENTION

This invention relates generally to the regeneration of cation ion exchange resins and their related condensate polisher units and more particularly to the regeneration of macroreticular types of cation exchange resins with certain organic salts of low volatility amines.

BACKGROUND OF THE INVENTION

The purpose of cation exchange resins and condensate polishers is twofold, to remove any undesirable cations such as calcium and/or magnesium ions by ion exchange and also to act as a filter to remove particulate iron and copper oxides which are present under normal operating conditions or during outages and start-up periods. When raw water containing calcium and magnesium salts is passed through a bed of cation ion exchange resin, which is in the sodium form, the calcium and magnesium ions are replaced by sodium ions from the exchanger. Thus, the use of cation exchange resins in the sodium form results in increased sodium levels in the condensate polisher effluent during periods of hardness ingress. Low pressure boiler systems are generally unaffected by these increased sodium levels. However, high pressure boiler systems, which generally use high purity demineralized water as make-up, cannot tolerate increased sodium levels due to the production of undesirable hydroxide ions in the boiler water. These hydroxide ions can interfere with the control of coordinated phosphate programs in these high pressure boiler systems and can thus result in corrosion problems. In addition, some boiler systems are treated with volatile amine corrosion inhibitors. These volatile amines can also be exchanged for sodium in the resin which results not only in high levels of sodium, but also in the undesirable removal of the volatile amine inhibitors from the system.

When the resin bed is exhausted, (i.e. the sodium ions are depleted, as indicated by the presence of calcium or magnesium ions in the effluent), the ion exchange resin may be regenerated by passing through the resin, an aqueous solution containing an excess of salt or brine. The regeneration of cation ion exchange resins with sodium chloride has been common practice.

U.S. Pat. No. 4,753,736 discloses the use of citrate salts of volatile amines to regenerate cation-exchange condensate polishers. This reference also discloses that the use of sulphates and acetates causes precipitation problems with calcium and iron respectively.

SUMMARY OF THE INVENTION

It is an object of this invention to provide a one-step method for regenerating cation exchange resins and their related condensate polisher units.

It is another object of this invention to provide a method for reducing the level of sodium in aqueous systems.

It is another object of this invention to provide a method for maintaining an appropriate treatment level of amine inhibitors in aqueous systems.

In accordance with the present invention there has been provided a method for regenerating cation exchange resins which comprises passing through the ion exchange resin an aqueous solution of an organic salt of a low volatility amine.

Also provided in accordance with the present invention is a method of treating water to remove undesirable cations comprising passing water through a bed of cation exchange resin wherein the resin is regenerated with an aqueous solution of an organic salt of a low volatility amine.

DETAILED DESCRIPTION OF THE INVENTION

The present invention is directed to the problems of sodium release and the reduction in concentration of amine corrosion inhibitors levels in aqueous systems caused by cation exchange resins which are used to treat the system water. It has now been discovered that cation exchange resins may be advantageously regenerated with certain readily ionizable organic acid salts of low volatility amines to provide a cation exchange resin that does not release sodium and does not reduce the concentration of amine corrosion inhibitors in the treates system. As used herein the term "low volatility" refers to those amines having a volatility ratio or Distribution Ratio of less than one at 100 psi wherein Distribution Ratio is expressed as:

$$DR = \frac{\text{amount of amine in vapor phase}}{\text{amount of amine in water phase}}$$

The use of low volatility amines is considered an important feature of this invention and is particularly advantageous during a raw water ingress into the system. Since raw water generally has a high ratio of chlorides and/or sulphates to alkalinity, and since the amine salts react with the alkalinity in the boiler water system to form free amines; the free amine produced from the reaction, if it is low in volatility, will not be lost in the vapor phase and will thus remain in the system water. If a more highly volatile amine is used, such as cyclohexylamine, it will be lost in the vapor phase and result in a corresponding loss in alkalinity and concomitant reduction in pH. For example,

Accordingly, low volatility amines which preferably are effective as neutralizing corrosion inhibitors including amines such as organic salts of $C_1$ to $C_4$ alkanol amines such as monoethanolamine, diethanolamine, 2-aminobutanol, isopropanolamine, and the like, or mixtures thereof are the preferred regenerant compounds for use in the practice of this invention.

Suitable organic anions of the regenerant compounds of this invention may be represented by the following formula:

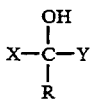

wherein X is COOH or $PO_3H$, Y is H, COOH or $PO_3H$ and R is H or $C_1$ to $C_{12}$ alkyl. The organic anion of the regenerant compounds of this invention should be readily ionizable in aqueous solutions. Hydroxyacetate and etidronate are the preferred organic anionic species. As demonstrated in the appended examples the regeneration efficiency of the organic salts of the low volatility amine regenerant compounds of this invention is superior to the prior art compounds.

Also provided in accordance with this invention is a method for the treatment of a water supply to remove undesirable cations which comprises passing the water through a cation ion exchange resin bed which was regenerated with an ionizable, organic salt of a low volatility amine wherein the organic anion is represented by the formula:

wherein X is COOH or PO$_3$H, Y is H, COOH or PO$_3$H and R is H or C$_1$ to C$_{12}$ alkyl.

The method of this invention is useful for regenerating cation exchange condensate polishers such as those in high pressure plants using demineralized make-up water for high purity feedwater and condensate for attemperating water. These resins are generally a macroreticular type of ion exchange resin. An example of these resins is Amberlite 200 TM which is commercially available from Rohm and Haas.

The regenerant compounds of this invention are useful for treating boiler condensate systems to not only remove undesirable cations from the aqueous system but also to provide neutralizing corrosion inhibitors to the system water and to provide buffer systems in boiler waters which use coordinated and or congruent phosphate programs.

The following examples are provided to illustrate the present invention in accordance with the principles of this invention, but are not to be construed as limiting the invention in any way except as indicated in the appended claims. All parts and percentages are by weight unless otherwise indicate.

EXAMPLES 1 THROUGH 6

Samples of condensate polisher resin were obtained from a plant which was presently using an amine regenerated system. The resin was Amberlite 200 TM from Rohm and Haas. The resin was analyzed to determine the ionic form and iron fouling present prior to carrying out any tests.

One inch diameter glass columns containing 100 mL of ion exchange resin as received were used for the tests. The resin was backwashed prior to introducing the regenerating solutions.

The spent regenerants and rinses were analyzed for metals by Inductively Coupled Argon Plasma emission spectroscopy and for amines by Gas Chromatography.

In order to determine the exchange efficiency of the regenerated resins, short runs were carried out using a synthetic water formulated as follows:
Calcium, ppm as Ca 1.00
Magnesium, ppm as Mg 0.20
Sodium, ppm as Na 0.50
Morpholine, ppm 6.00
Cyclohexylamine, ppm 6.50
Diethylaminoethanol, ppm 3.00

The results of these evaluations are provided in Table 1.

TABLE 1

| Example Number | Percent Removal | | | | | | |
|---|---|---|---|---|---|---|---|
|  | 1 | 2 | 3 | 4 | 5 | 6 | 8 |
| Calcium | 98.2 | 99.1 | 99 | 98.9 | 96.2 | 97.3 | 98 |
| Magnesium | 99.3 | 99.3 | 99.4 | 99.4 | 96.4 | 97.4 | 98 |
| Sodium | 42.4 | 64.7 | 81.2 | 43.1 | 32.4 | 46.1 | 90 |
| Morpholine | 3.0 | −112 | 88.5 | 67.4 | −162 | 57.7 | 100 |
| Cyclohexyl-amine | 72.8 | 63.7 | 86.9 | −15.9 | 39.7 | 47.3 | 100 |
| Diethylaminoethanol | 80 | 69.6 | 100 | 75 | 56.9 | 61.9 | 100 |

The following is a list of regenerants used in the examples.

Example 1 Ammonium sulphate followed by morpholine
Example 2 Sulphuric acid followed by morpholine
Example 3 Diethanolamine hydroxyacetate
Example 4 Cyclohexylamine citrate
Example 5 Morpholine hydroxyacetate
Example 6 Monoethanolamine hydroxyacetate
Example 8 Monoethanolamine etidronate
Example 9 Monoethanolamine phosphonobutane tricarboxylate
Example 10 L-2 Aminobutanol hydroxyacetate
Example 11 Monoisopropanolamine hydroxyacetate The results of the regeneration efficiency analyses of the spent regenerants is provided in Table 2. From this data it is apparent that only the resin treated in accordance with the method of this invention, i.e., examples 3, 6, 8, 10 and 11 removed the majority of the contaminants from the ion exchange resin.

TABLE 2

| | meq/Ml on Resin After Regeneration | | | |
|---|---|---|---|---|
| | Calcium | Magnesium | Sodium | Iron as Mg/Ml |
| As Received | 0.386 | 0.123 | 0.124 | 3.04 |
| Example 1 | 0.272 | 0.527 | <0.002 | 2.12 |
| Example 2 | 0.313 | 0.058 | <0.002 | 2.27 |
| Example 3 | 0.257 | 0.058 | 0.018 | 1.07 |
| Example 4 | 0.253 | 0.031 | 0.037 | 1.22 |
| Example 5 | 0.245 | 0.036 | 0.057 | 1.76 |
| Example 6 | 0.034 | 0.004 | 0.023 | 1.01 |
| Example 8 | 0.050 | 0.04 | 0.002 | 0.90 |
| As received | 0.550 | 0.179 | 0.034 | 1.59 |
| Example 9 | 0.002 | 0.015 | 0.002 | 0.32 |
| Example 10 | 0.116 | 0.033 | 0.007 | 0.52 |
| Example 11 | 0.178 | 0.042 | 0.010 | 0.55 |

EXAMPLE 7

This example used the regenerated resin from Example 6, which, after a short run was again regenerated using the procedure used in Example 6. This resin was then subjected to an extended run using varying feed solutions to determine their effect on sodium removal.

This example was run for 1250 bed volumes and the results are shown in Table 3.

TABLE 3

Example 7

| Feed Solution | Calcium Removal | Magnesium Removal | Sodium Removal | Bed Volumes |
|---|---|---|---|---|
| A | >98 | 98 | 79 | 20–100 |
| A | >98 | >98 | 85 | 120–200 |
| A | >98 | >98 | 85 | 220–290 |
| A | >98 | >98 | 80 | 310–480 |
| A | >98 | >98 | 80 | 500–660 |
| B | 97 | 97 | 70 | 680–850 |
| B | 97 | >98 | 78 | 870–910 |
| C | >98 | >98 | 80 | 930–990 |
| A | >98 | >98 | 82 | 1010–1070 |
| D | >98 | >98 | 79 | 1090–1160 |
| E | >98 | >98 | 85 | 1180–1250 |

| Feed Solutions | A | B | C | D | E |
|---|---|---|---|---|---|
| Calcium | 1.00 | 0.95 | 0.95 | 0.95 | 0.99 |
| Magnesium | 0.21 | 0.21 | 0.20 | 0.21 | 0.19 |
| Sodium | 0.53 | 0.45 | 0.45 | 0.48 | 0.44 |
| Morpholine | 7.0 | 0.0 | 7.1 | 6.4 | 1.6 |
| Cyclohexylamine | 8.2 | 0.0 | 9.0 | 8.7 | 1.9 |
| Diethylaminoethanol | 3.6 | 0.0 | 3.4 | 3.3 | 0.7 |
| Monoethanolamine | 0.0 | 12.0 | 0.0 | 5.0 | 5.0 |

Conclusions

The use of organic salts of low volatility amines as a one step regeneration procedure for condensate polisher cation exchange resins resulted in improved sodium ion removal during raw water ingress.

The use of the hydroxyacetate salt of the ethanolamines provided more efficient removal of contaminants from the condensate polisher cation exchange resins during regeneration than any of the comparative examples.

The use of low volatility amines resulted in improved buffering of the boiler water system as a consequence of raw water ingress into the condensate system.

The use of an organophosphate salt of a low volatility amine provided more efficient removal of contaminants from the condensate polisher cation exchange resins during regeneration than any of the comparative examples.

TABLE 4

Volatility of Various Compounds

| Compound | Volatility Ratio at 100 PSI | Volatility Ratio at 500 PSI |
|---|---|---|
| Monoethanolamine | 0.1 | 0.17 |
| Diethanolamine | <<0.1 | — |
| 2-Aminomethylpropanol | 0.3 | 0.85 |
| 3-Methoxypropylamine | 2.0 | 2.2 |
| Isopropylamine | 20 | — |
| Morpholine | 1.0 | 1.2 |
| Cyclohexylamine | 12 | 9.0 |
| Diethylaminoethanol | 3.6 | 5.2 |
| 2-Aminobutanol | 0.3 | 0.4 |
| Isopropanolamine | 0.1 | 0.2 |

Experimental Conditions

All tests were done with an experimental steam generator. The boiler water conditions were: pH 12, 100 PSI and 500 PSI (243° C.) (170° C. boiler water temperature) and ten cycles of concentration. The boiler feedwater influent had less than 0.1 ppm dissolved oxygen. All steam generated was condensed. The Volatility Ratio or Distribution Ratio is defined as the ratio of the concentration of amine in total steam produced (vapor phase) to the concentration of amine in the boiler blowdown (water phase). Determinations of these concentrations were done by gas chromatography or alkalinity.

$$\text{Volatility Ratio} = \frac{\text{ppm in total condensed steam}}{\text{ppm in blowdown}}$$

We claim:

1. A method for regenerating cation exchange resins comprising passing through the resin an aqueous solution of an organic salt of a low volatility amine wherein the organic anion is represented by the following formula:

wherein X is COOH or $PO_3H$, Y is H, COOH or $PO_3H$ and R is H or $C_1$ to $C_{12}$ alkyl.

2. A method according to claim 1, wherein the amine is a low volatility, $C_1$ to $C_4$ alkanolamine.

3. A method according to claim 2 wherein the alkanolamine is selected from the group consisting of monoethanolamine, diethanolamine, isopropanolamine, 2-aminobutanol, and mixtures thereof.

4. A method according to claim 3, wherein the amine salt is monoethanolamine hydroxyacetate.

5. A method according to claim 3, wherein the amine salt is diethanolamine hydroxyacetate.

6. A method according to claim 3, wherein the amine salt is monoethanolamine etidronate.

7. A method according to claim 3, wherein the amine salt is diethanolamine etidronate.

8. A method for treating water to remove undesirable cations comprising passing the water through a bed of cation exchange resin wherein the resin was regenerated with an aqueous solution of an organic salt of a low volatility amine wherein the organic anion is represented by the formula:

wherein X is COOH or $PO_3H$, Y is H, COOH or $PO_3H$ and R is H or $C_1$ to $C_{12}$ alkyl.

9. A method according to claim 8, wherein the amine is a low volatility, $C_1$ to $C_4$ alkanolamine.

10. A method according to claim 9 wherein the alkanolamine is selected from the group consisting of monoethanolamine, diethanolamine, isopropanolamine, 2-aminobutanol, and mixtures thereof.

11. A method according to claim 10, wherein the amine salt is monoethanolamine hydroxyacetate.

12. A method according to claim 10, wherein the amine salt is diethanolamine hydroxyacetate.

13. A method according to claim 10, wherein the amine salt is monoethanolamine etidronate.

14. A method according to claim 10, wherein the amine salt is diethanolamine etidronate.

* * * * *